(12) United States Patent
Calman et al.

(10) Patent No.: US 9,646,342 B2
(45) Date of Patent: May 9, 2017

(54) REMOTE CONTROL FOR ONLINE BANKING

(71) Applicant: BANK OF AMERICA CORPORATION, Charlotte, NC (US)

(72) Inventors: Matthew A. Calman, Charlotte, NC (US); William E. Kelley, Charlotte, NC (US); Chris Purvis, Waxhaw, NC (US); Dipika Jain, Charlotte, NC (US); Michael E. Toth, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 4 days.

(21) Appl. No.: 13/946,183

(22) Filed: Jul. 19, 2013

(65) Prior Publication Data

US 2015/0026025 A1    Jan. 22, 2015

(51) Int. Cl.
G06Q 20/32 (2012.01)
G06Q 20/40 (2012.01)
G06Q 40/02 (2012.01)

(52) U.S. Cl.
CPC .................................. *G06Q 40/02* (2013.01)

(58) Field of Classification Search
CPC .... G06Q 20/32; G06Q 20/40; G06Q 20/3278; G06Q 20/325; G06Q 20/322
USPC ............................................. 705/35, 42, 44
See application file for complete search history.

(56) References Cited

U.S. PATENT DOCUMENTS

| | | |
|---|---|---|
| 4,960,981 A | 10/1990 | Benton et al. |
| 5,416,903 A | 5/1995 | Malcolm |
| 5,699,244 A | 12/1997 | Clark, Jr. et al. |
| 5,861,882 A | 1/1999 | Sprenger et al. |
| 5,889,863 A | 3/1999 | Weber |
| 5,930,764 A | 7/1999 | Melchione et al. |

(Continued)

FOREIGN PATENT DOCUMENTS

WO    WO-2012/067640 A1    5/2012

OTHER PUBLICATIONS

International Preliminary Report on Patentability and Written Opinion dated Aug. 28, 2012 for International Application No. PCT/US2011/026119.

(Continued)

*Primary Examiner* — Jagdish Patel
(74) *Attorney, Agent, or Firm* — Michael A. Springs; Moore & Van Allen PLLC; Peter B. Stewart

(57) ABSTRACT

Disclosed is a system and associated method of using a customer's mobile device as an online banking remote control for another customer device. The system typically includes a processor, a memory, and an online banking module stored in the memory. The module is typically configured for (i) associating the mobile device with the customer's online banking account and (ii) binding the mobile device to another computing device. In addition, the module is typically configured for subsequently receiving a remote access command associated with the customer's online banking account and associated with the computing device from the mobile device. The remote access of the computing device to the customer's online banking account can then be modified based on the remote access command and determining that (i) the mobile device is associated with the customer's online banking account and (ii) the mobile device is bound to the computing device.

15 Claims, 6 Drawing Sheets

(56) References Cited

U.S. PATENT DOCUMENTS

| | | | |
|---|---|---|---|
| 6,073,119 | A | 6/2000 | Bornemisza-Wahr et al. |
| 6,354,490 | B1 | 3/2002 | Weiss et al. |
| D455,436 | S | 4/2002 | Cassano et al. |
| 6,445,682 | B1 | 9/2002 | Weitz |
| 6,505,238 | B1* | 1/2003 | Tran .................... H04L 61/1523 709/208 |
| 6,647,372 | B1 | 11/2003 | Brady et al. |
| 6,760,414 | B1 | 7/2004 | Schurko et al. |
| 6,910,020 | B2 | 6/2005 | Oyama et al. |
| 7,084,758 | B1 | 8/2006 | Cole |
| 7,100,200 | B2 | 8/2006 | Pope et al. |
| D545,832 | S | 7/2007 | Armendariz |
| 7,305,470 | B2 | 12/2007 | Tom et al. |
| 7,321,775 | B2 | 1/2008 | Maanoja |
| D567,249 | S | 4/2008 | Gunn et al. |
| 7,378,939 | B2 | 5/2008 | Sengupta et al. |
| D578,134 | S | 10/2008 | Jasinski |
| D579,459 | S | 10/2008 | Tomizawa et al. |
| 7,464,057 | B2 | 12/2008 | Cole et al. |
| 7,478,143 | B1 | 1/2009 | Friedman et al. |
| 7,478,338 | B2 | 1/2009 | Yanchar et al. |
| D586,352 | S | 2/2009 | Park et al. |
| 7,499,875 | B1 | 3/2009 | May et al. |
| 7,519,036 | B2 | 4/2009 | Zhang |
| 7,571,140 | B2 | 8/2009 | Weichert et al. |
| D599,813 | S | 9/2009 | Hirsch |
| 7,751,829 | B2 | 7/2010 | Masuoka et al. |
| 7,766,223 | B1 | 8/2010 | Mello et al. |
| 7,782,302 | B2 | 8/2010 | Lee et al. |
| 7,788,151 | B2 | 8/2010 | Pizzi et al. |
| 7,813,983 | B2 | 10/2010 | Wottowa et al. |
| 7,819,307 | B2* | 10/2010 | Lyons et al. .................. 235/379 |
| 7,857,212 | B1 | 12/2010 | Matthews |
| 7,899,006 | B2 | 3/2011 | Boyd |
| 7,949,603 | B1 | 5/2011 | Cao et al. |
| 7,966,496 | B2 | 6/2011 | Ellmore |
| 8,069,084 | B2 | 11/2011 | Mackouse |
| 8,077,688 | B2 | 12/2011 | Zhang |
| 8,136,148 | B1 | 3/2012 | Chayanam et al. |
| 8,150,387 | B2 | 4/2012 | Klein et al. |
| 8,176,077 | B2 | 5/2012 | Stevens |
| 8,185,472 | B1 | 5/2012 | Boyd et al. |
| 8,186,578 | B1 | 5/2012 | Block et al. |
| 8,255,981 | B2 | 8/2012 | Pearson et al. |
| 8,295,898 | B2 | 10/2012 | Ashfield et al. |
| 8,320,901 | B2 | 11/2012 | Klein et al. |
| 8,374,324 | B2 | 2/2013 | Suryanarayana et al. |
| 8,381,975 | B2 | 2/2013 | Davila et al. |
| 8,452,693 | B2 | 5/2013 | Shah et al. |
| 8,479,978 | B1 | 7/2013 | Miller et al. |
| 8,555,355 | B2 | 10/2013 | Rathbun |
| 8,788,389 | B1 | 7/2014 | Fernandes |
| 9,112,994 | B2 | 8/2015 | Yamada et al. |
| 2002/0059384 | A1 | 5/2002 | Kaars |
| 2002/0120582 | A1 | 8/2002 | Elston et al. |
| 2003/0101116 | A1 | 5/2003 | Rosko et al. |
| 2003/0182194 | A1 | 9/2003 | Choey et al. |
| 2003/0190921 | A1 | 10/2003 | Stewart |
| 2003/0204460 | A1 | 10/2003 | Robinson et al. |
| 2004/0061720 | A1* | 4/2004 | Weber ................ G06F 17/30899 715/760 |
| 2004/0122736 | A1 | 6/2004 | Strock et al. |
| 2004/0158549 | A1 | 8/2004 | Matena et al. |
| 2005/0097000 | A1 | 5/2005 | Freishtat et al. |
| 2006/0089908 | A1 | 4/2006 | Keohane et al. |
| 2006/0153173 | A1 | 7/2006 | Beck et al. |
| 2006/0194592 | A1 | 8/2006 | Clough |
| 2006/0195816 | A1 | 8/2006 | Grandcolas et al. |
| 2006/0235953 | A1 | 10/2006 | Meier |
| 2007/0061254 | A1 | 3/2007 | Blunck et al. |
| 2007/0133487 | A1 | 6/2007 | Wang et al. |
| 2007/0136573 | A1 | 6/2007 | Steinberg |
| 2007/0219865 | A1 | 9/2007 | Leining |
| 2007/0265948 | A1 | 11/2007 | Maiorino et al. |
| 2007/0288357 | A1 | 12/2007 | Holman et al. |
| 2007/0288373 | A1 | 12/2007 | Wilkes |
| 2008/0046367 | A1 | 2/2008 | Billmaier et al. |
| 2008/0082351 | A1 | 4/2008 | Kelley-Hrabe et al. |
| 2008/0091600 | A1 | 4/2008 | Egnatios et al. |
| 2008/0156870 | A1 | 7/2008 | Niedermeyer |
| 2008/0162338 | A1 | 7/2008 | Samuels et al. |
| 2008/0215377 | A1 | 9/2008 | Wottowa et al. |
| 2008/0227471 | A1 | 9/2008 | Dankar et al. |
| 2008/0243586 | A1 | 10/2008 | Dohring et al. |
| 2008/0306848 | A1 | 12/2008 | Bartholomew et al. |
| 2009/0012898 | A1 | 1/2009 | Sharma et al. |
| 2009/0024526 | A1 | 1/2009 | Erickson |
| 2009/0048916 | A1 | 2/2009 | Nuzum et al. |
| 2009/0181665 | A1 | 7/2009 | Sater et al. |
| 2009/0206157 | A1 | 8/2009 | Heffez et al. |
| 2009/0271287 | A1 | 10/2009 | Halpern |
| 2009/0276321 | A1 | 11/2009 | Krikorian et al. |
| 2009/0292595 | A1 | 11/2009 | Tonnison et al. |
| 2009/0313106 | A1 | 12/2009 | Taylor et al. |
| 2009/0328052 | A1 | 12/2009 | Nguyen et al. |
| 2010/0005024 | A1 | 1/2010 | Schmitz et al. |
| 2010/0006642 | A1 | 1/2010 | Boutcher et al. |
| 2010/0024017 | A1 | 1/2010 | Ashfield et al. |
| 2010/0042542 | A1 | 2/2010 | Rose et al. |
| 2010/0100480 | A1 | 4/2010 | Altman et al. |
| 2010/0138316 | A1 | 6/2010 | Connors et al. |
| 2010/0153269 | A1 | 6/2010 | McCabe |
| 2010/0161467 | A1 | 6/2010 | Ageenko et al. |
| 2010/0169151 | A1 | 7/2010 | Xu |
| 2010/0241564 | A1 | 9/2010 | Miller et al. |
| 2010/0280962 | A1 | 11/2010 | Chan |
| 2010/0332389 | A1 | 12/2010 | Al-Sahli |
| 2011/0010203 | A1 | 1/2011 | Wottowa et al. |
| 2011/0022517 | A1 | 1/2011 | Hammad |
| 2011/0029363 | A1 | 2/2011 | Gillenson et al. |
| 2011/0131096 | A1 | 6/2011 | Frew et al. |
| 2011/0137804 | A1 | 6/2011 | Peterson |
| 2011/0208629 | A1 | 8/2011 | Benefield et al. |
| 2011/0215921 | A1 | 9/2011 | Ben Ayed et al. |
| 2011/0238582 | A1 | 9/2011 | Dasari et al. |
| 2011/0251888 | A1* | 10/2011 | Faith et al. ................ 705/14.43 |
| 2011/0302083 | A1* | 12/2011 | Bhinder ........................ 705/44 |
| 2012/0022944 | A1 | 1/2012 | Volpi |
| 2012/0029990 | A1 | 2/2012 | Fisher |
| 2012/0140993 | A1 | 6/2012 | Bruso et al. |
| 2012/0166336 | A1 | 6/2012 | Hartmaier |
| 2012/0173431 | A1 | 7/2012 | Ritchie et al. |
| 2012/0185386 | A1 | 7/2012 | Salama et al. |
| 2013/0060692 | A1 | 3/2013 | Typrin et al. |
| 2013/0091042 | A1 | 4/2013 | Shah et al. |
| 2013/0124364 | A1 | 5/2013 | Mittal |
| 2013/0246260 | A1 | 9/2013 | Barten et al. |
| 2013/0246265 | A1* | 9/2013 | Al-Sahli ........................ 705/43 |
| 2013/0290119 | A1 | 10/2013 | Howe et al. |
| 2014/0207672 | A1 | 7/2014 | Kelley |
| 2014/0214670 | A1 | 7/2014 | McKenna |
| 2014/0236792 | A1 | 8/2014 | Pant et al. |
| 2014/0279332 | A1 | 9/2014 | Poole |
| 2014/0279490 | A1 | 9/2014 | Calman et al. |

OTHER PUBLICATIONS

Janet Bigham Bernstel, "One-Two Marketing Punch!", ABA Bank Marketing, Oct. 2002, vol. 34, Issue 8, p. 16, 6p.

John Adams, "CRM: Keep 'Em Coming Back; Consumer onboarding's never been more important, or automated", Bank Technology News, May 2009, vol. 22, Issue 5, p. 1.

Melanie Scarborough, "Keeping New Customers on Board", Community Banker, Nov. 2008, vol. 17, Issue 11, p. 20.

Chris Costanzo, "Maximizing Marketing With E-mail, YouTube", Community Banker [serial online], Apr. 2009, vol. 18, Issue 4, p. 34-38.

Tanja Lian Sablosky, "How to Lure Them Online", ABA Bank Marketing, Sep. 2003, vol. 35, Issue 7, p. 28-31, 4p, 1 Color Photograph.

The Point Staff, "How to Control the Costs of Online Banking Support", Point for Credit Union Research & Advice, Dec. 22, 2003, pN.PAG, 0p.

(56) References Cited

OTHER PUBLICATIONS

James Swann, "Online Bill Pay: Getting Customers to Use It", Community Banker, Nov. 2004, vol. 13, Issue 11, p. 42-47, 5p.
Chris Costanzo, "you've got customers!", Community Banker, Dec. 2007, vol. 16, Issue 12, p. 34-37, 4p.
Diana Tummillo, "A Way to Grow Core Deposits", ABA Bank Marketing, Sep. 2006, vol. 38, Issue 7, p. 40-43, 4p.
International Search Report for International Application No. PCT/US2009/051121dated Aug. 26, 2009.
Terry Sweeney, "SIS Taps Mobiles To Reduce Credit Fraud", Mar. 5, 2008, http://www.informationweek.com/sis-taps-mobiles-to-reduce-credit-fraud/206901958.
mConfirm—Fraud Management Solutions for Credit Card Issuers, http://www.mconfirm.com, May 13, 2008.
"Security System Matches Card Purchase to Cellphone Location", ePaynews, the Payment News and Resource Center, http://www.epaynews.com/index.cgi?survey=false&keywords=&optional=7subject=Banking%20, May 13, 2008.
Budnitz, M.E. (2013), Mobile Banking: Gaps in the law impede risk assessment. Banking & Financial Services Policy Report, 32(5), 11(10), Retrieved from http://dialog.proquest.com/professional/docview/1355667653?accountid=142257 on Oct. 1, 2016.

\* cited by examiner

REMOTE CONTROL FOR ONLINE BANKING

FIELD OF THE INVENTION

The present invention embraces a system for providing a remote control for a customer's mobile and online banking account. The system typically includes a processor, a memory, and an online banking module stored in the memory. The online banking module is typically configured to allow a mobile device to act as remote control.

BACKGROUND

Over the last few years, the use of online banking (e.g., mobile banking) has increased dramatically. Online banking provides users with many useful features that typically include, among other things, allowing users to view account balances, view transaction history, view statements, transfer funds, and pay bills. That said, a need exists for users to have increased control over their online banking accounts.

SUMMARY

In one aspect, the present invention embraces a method of providing for remote control of a customer's online banking account. In a particular embodiment, the present invention embraces a method of using a customer's mobile device as an online banking remote control for another customer device. The present invention also embraces a system (e.g., an online banking system) configured for performing one or more of the steps of the method.

The method typically includes, initially, receiving an association request from a customer to associate a first mobile device with the customer's online banking account. The association request typically includes device identification information associated with the first mobile device and first account identification information associated with the customer's online banking account. Next, the device identification information associated with the first mobile device is associated with the customer's online banking account, and an association record based on the device identification information associated with the first mobile device and the first account identification information associated with the customer's online banking account is created.

Subsequently, a binding request from the customer to bind the first mobile device with a first computing device is received. The binding request typically includes the device identification information associated with the first mobile device, device identification information associated with the first computing device, and second account identification information associated with the customer's online banking account. The device identification information associated with the first mobile device is then bound with the device identification information associated with the first computing device. In addition, a binding record based on the device identification information associated with the first mobile device, the device identification information associated with the first computing device, and the second account identification information associated with the customer's online banking account is created.

Later, a remote access command associated with the customer's online banking account is received from the first mobile device. The remote access command typically includes the device identification information associated with the first mobile device, the device identification information associated with the first computing device, and third account identification information associated with the customer's online banking account. A database of records is then searched to determine (i) if the device identification information associated with the first mobile device is associated with the customer's online banking account and (ii) if the device identification information associated with the first mobile device is bound to the device identification information associated with the first computing device. Finally, the remote access of the first computing device to the customer's online banking account is modified based upon the remote access command and determining that (i) the device identification information associated with the first mobile device is associated with the customer's online banking account and (ii) the device identification information associated with the first mobile device is bound to the device identification information associated with the first computing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
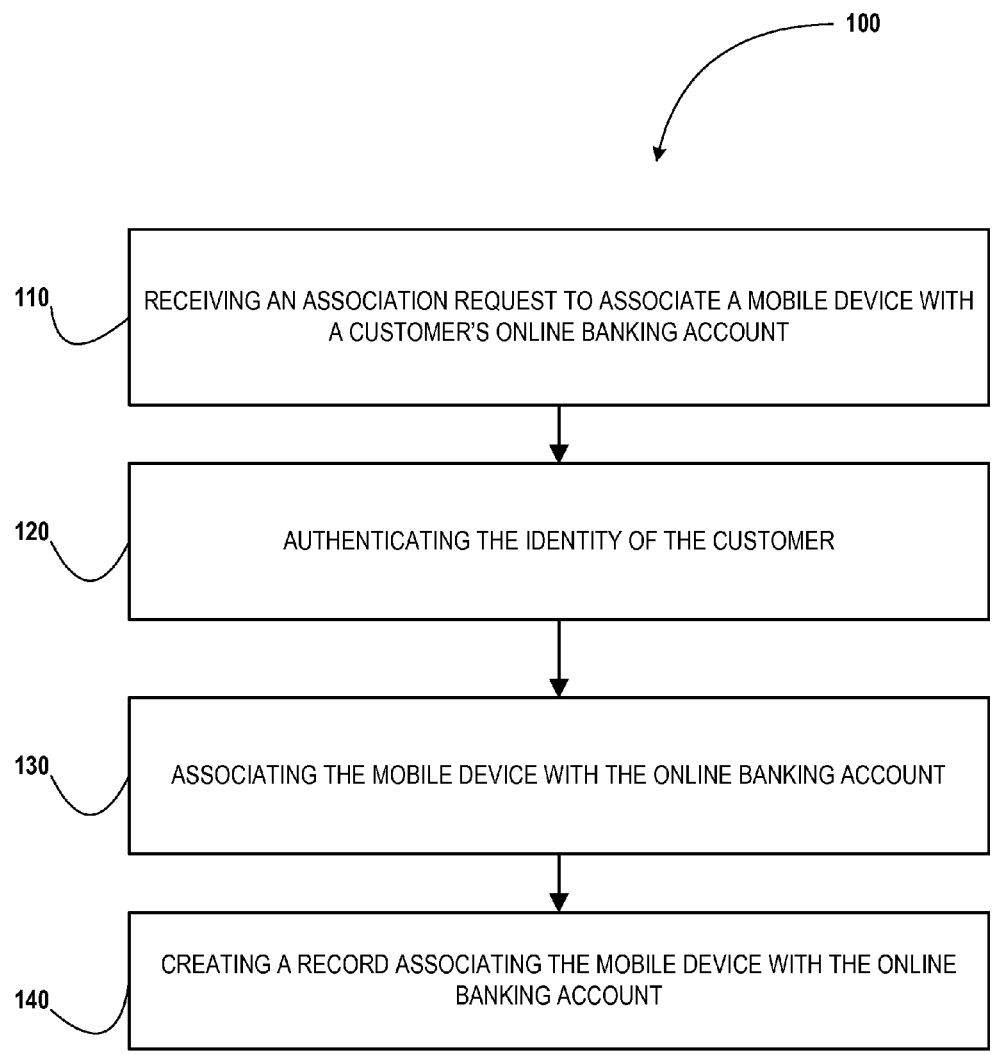
Figure 2:
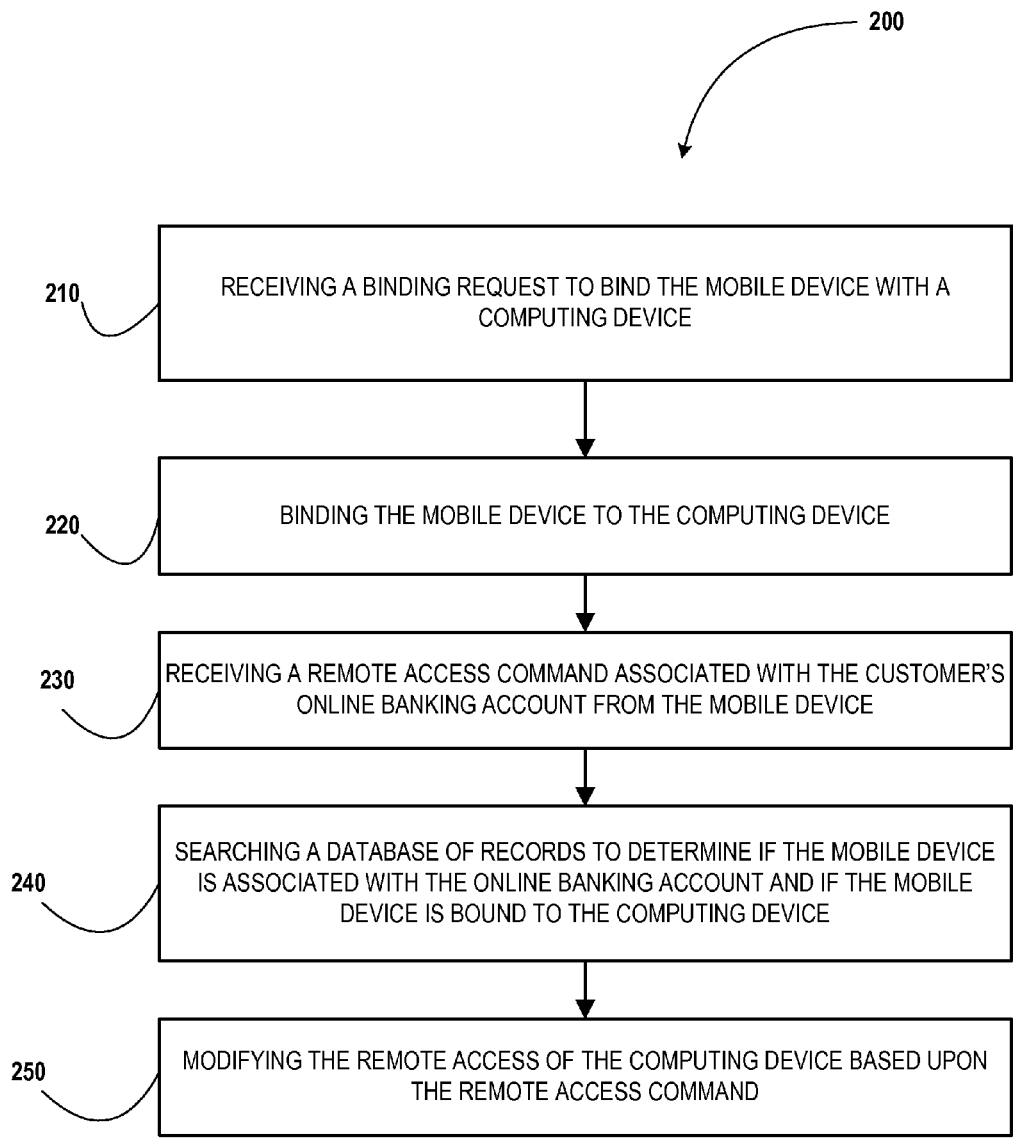
Figure 3:
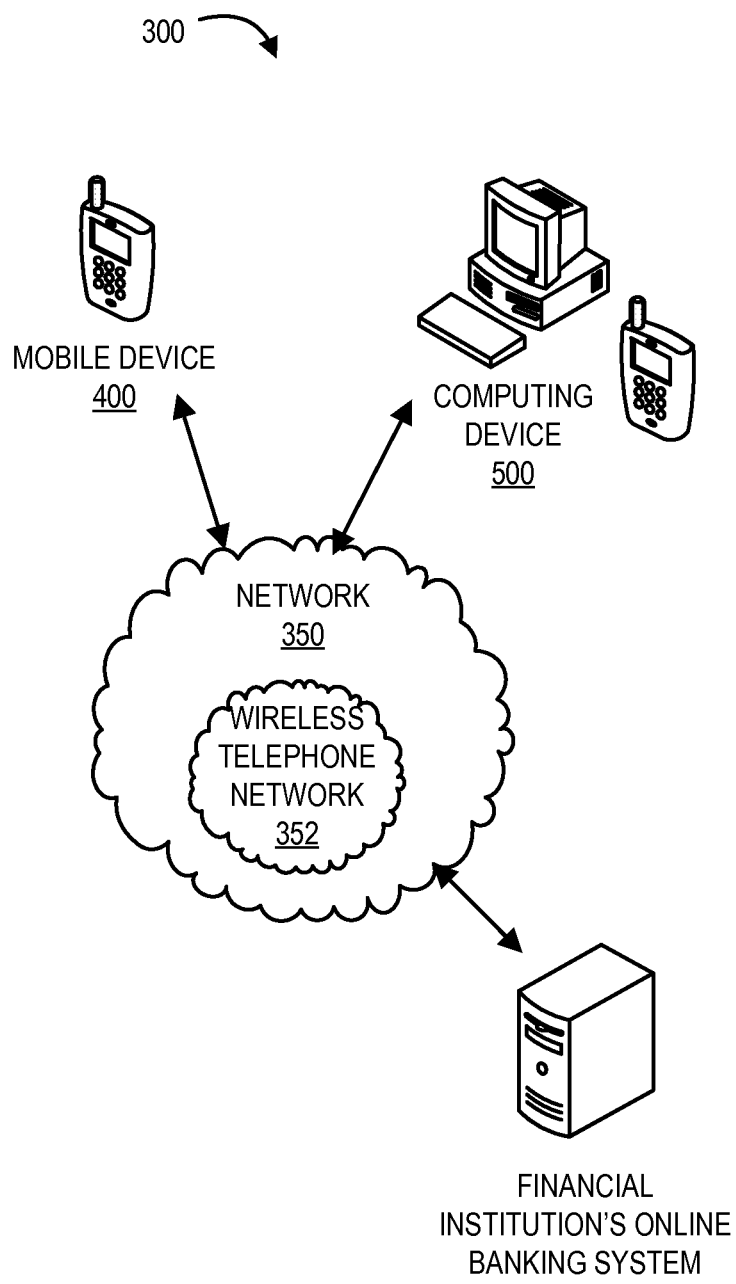
Figure 4:
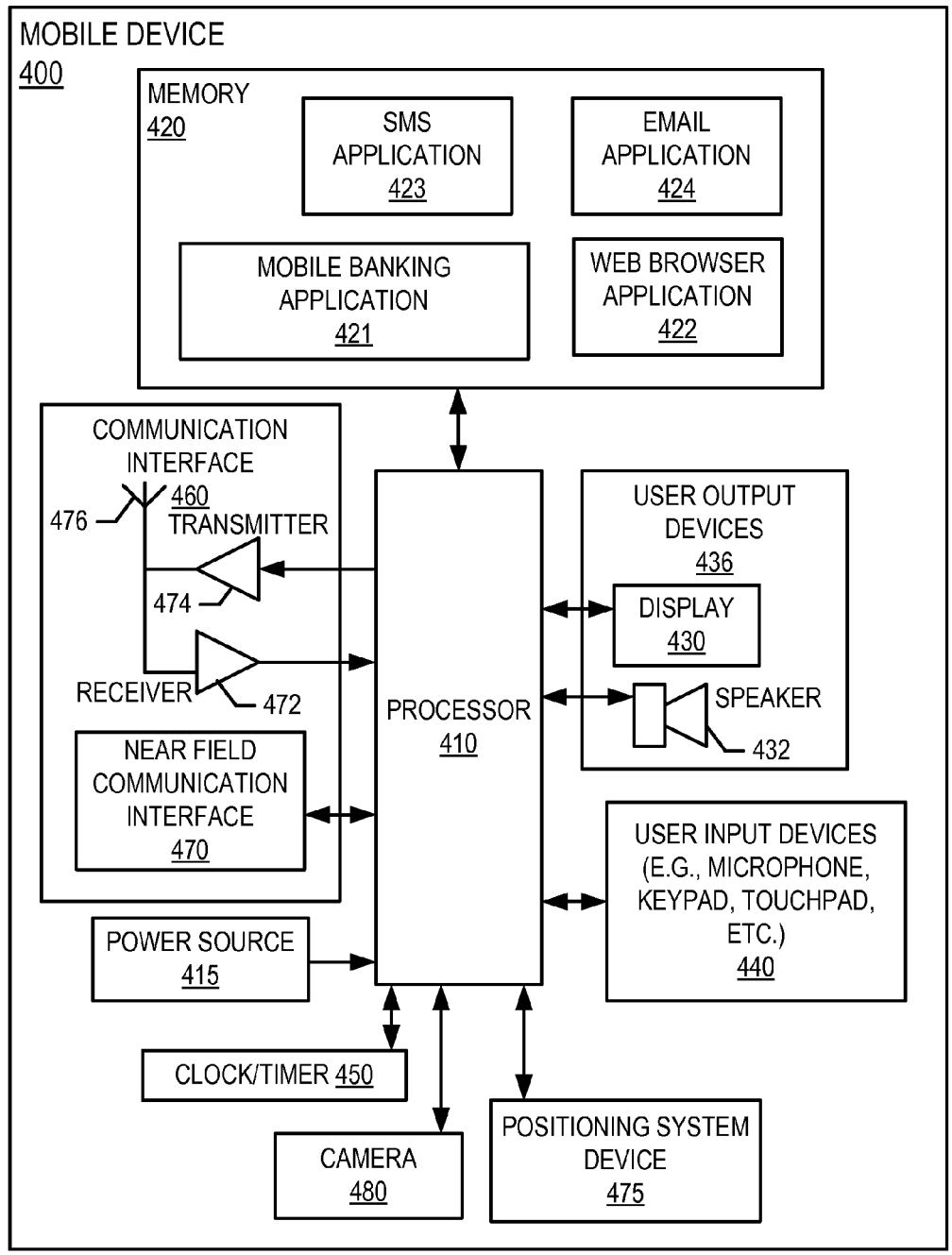
Figure 5:
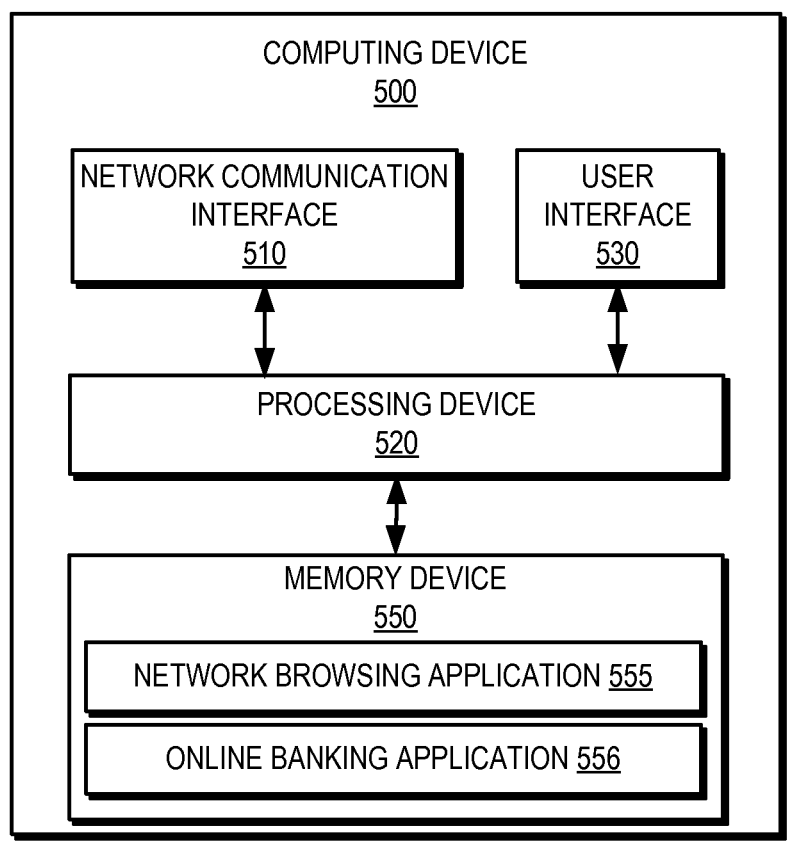
Figure 6:
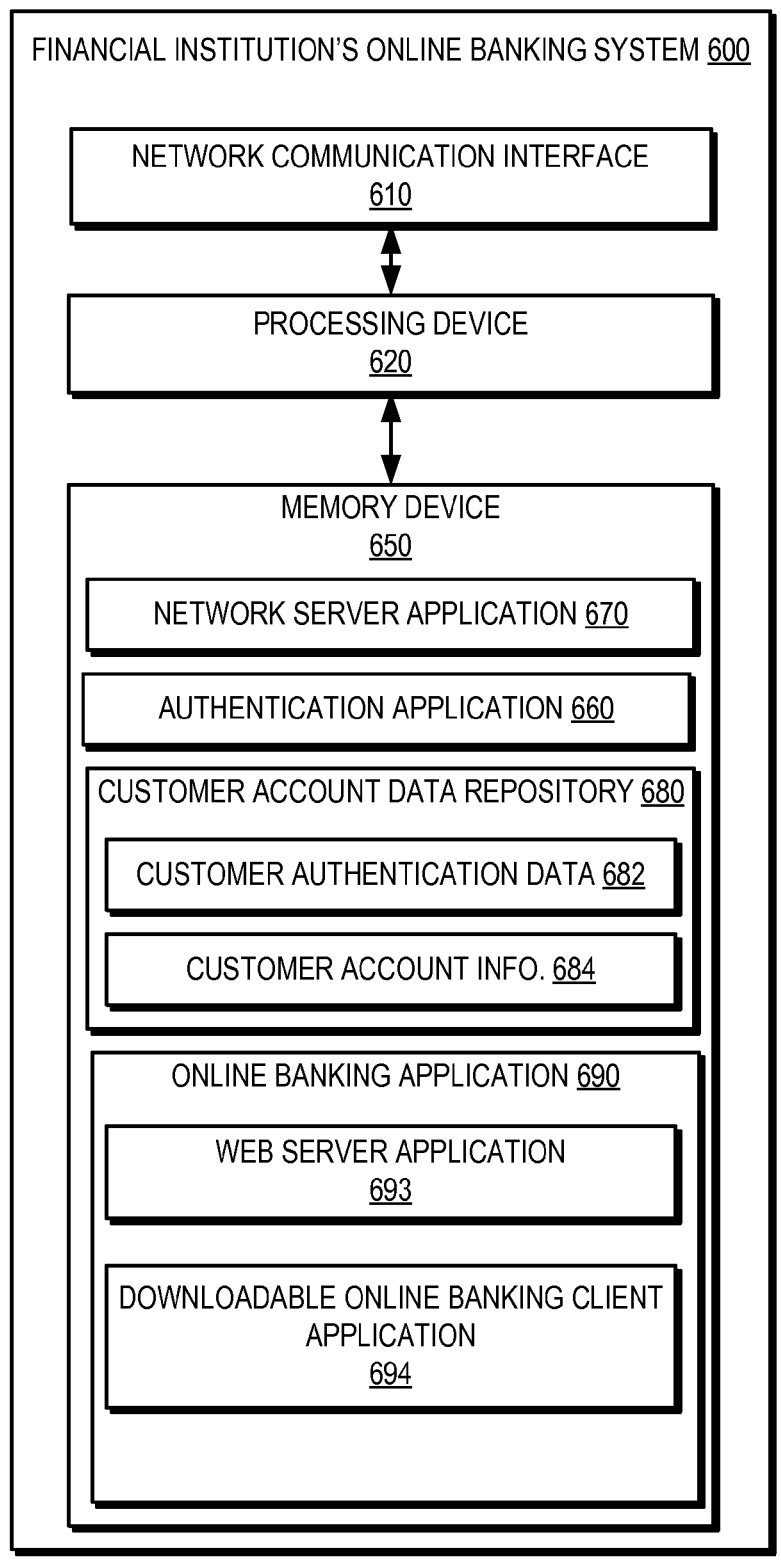

Having thus described embodiments of the invention in general terms, reference will now be made the accompanying drawings, wherein:

FIG. 1 depicts a method for enrolling a customer's mobile device as an online banking remote control in accordance with an aspect of the present invention;

FIG. 2 depicts a method for using an enrolled mobile device as an online banking remote control for a customer's computing device in accordance with an aspect of the present invention;

FIG. 3 depicts an online banking system and environment in accordance with an aspect of the present invention;

FIG. 4 schematically depicts a customer's mobile device in accordance with an aspect of the present invention;

FIG. 5 schematically depicts a customer's computing device in accordance with an aspect of the present invention; and FIG. 6 schematically depicts an online banking system in accordance with an aspect of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by an entity. In other embodiments, an "entity" may not be a financial institution.

As used herein, an "online banking account" is an account that is associated with one or more user accounts at a financial institution. For example, the user may have an online banking account that is associated with the user's checking account, savings account, investment account, and credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded). In other embodiments, the "customer" may refer to the user.

In one aspect, the present invention generally relates to a system (e.g., an online banking system) for providing a remote control for a customer's mobile and online banking account. More particularly, the present invention typically allows a customer to use a mobile device to control access to the customer's online banking account. Furthermore, a customer's mobile device may be used to identify the customer.

Referring now to FIG. 1, a general process flow 100 is provided for enrolling a customer's mobile device as an online banking remote control. This method is typically performed by an online banking system. Although enrolling a mobile device is discussed below, it is within the scope of the present invention to enroll other computing devices such as a personal computer.

At block 110, the method includes receiving (e.g., at an online banking system) an association request to associate (e.g., enroll) the mobile device (e.g., a laptop, personal digital assistant (PDA), cell phone, smart phone, tablet, mp3 player, or any other suitable electronic device) with the customer's online banking account. The association request may be submitted by the mobile device via a mobile application (e.g., a mobile banking application) or via a mobile banking website. For example, a mobile banking application downloaded onto the mobile device may prompt the customer to enroll the mobile device as an online banking remote control (e.g., after the customer has initiated an online banking session by providing their username and password).

The association request typically includes device identification information associated with the mobile device and account identification information associated with the customer's online banking account.

The device identification information associated with the mobile device may be any information sufficient to generate a device "fingerprint," or unique signature of the customer's mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In alternative embodiments, a unique key, code, or piece of software provided by a financial institution may be downloaded onto the mobile device. This unique key, code, or piece of software may then serve as device authentication information. In some embodiments, device identification information may need to be entered manually at the mobile device. For example, the online banking system may prompt the customer for manual entry of the device identification information (e.g., a serial number, an identification code, an International Mobile Station Equipment Identity (IMEI), a phone number, a chip, a removable part, or similar pieces of device identification information). In other embodiments, device identification information may not be based on user input received at the mobile device. Instead, the device identification information may be automatically provided by the mobile device. In yet another embodiment, the mobile device may provide the information without requiring user input after receiving a request from the online banking system for the identification information.

The account identification information may be any information sufficient to identify the customer's online banking account. In some embodiments, the account identification information may include, but is not limited to, at least one of a customer name, contact information, a username, a password, a PIN number, a unique identification number associated with the customer, social network information, an account number, or a card number. In some embodiments, the account identification information may be proprietary to the financial institution, such as an account number, a reference number to an account, a client number, or the like. In other embodiments, the account identification information may be public information, such as a phone number, mailing address, email address, or the like. The account identification information may be automatically provided by the mobile device. Alternatively, the customer may manually provide this information. For example, the customer may enter a username and a password associated with the customer's online banking account. The username and password may be provided in conjunction with the association request or may have been previously provided at the beginning of an online banking session, such as a mobile banking session (e.g., in order to log into a mobile banking application or mobile banking website). Accordingly, the account identification information may include information related to an online banking session (e.g., a mobile banking session).

At block 120, the method typically includes authenticating the identity of the customer. For example, the online banking system may prompt the customer to enter authentication information (e.g., customer identification information) such as a username, a password, a personal identification number (PIN), a passcode, biometric information (e.g., voice authentication, a fingerprint, and/or a retina scan), or an answer to a security question. This authentication information may be used to authenticate the identity of the customer (e.g., determine that the authentication information is associated with the account) and determine that the customer has authority to access the online banking account. In one embodiment, authentication information may include a unique intrinsic user activity, such as making a predefined motion with a customer device. Using a unique intrinsic user activity for authentication is described in commonly assigned U.S. Pat. No. 8,116,453, which is hereby incorporated by reference in its entirety. In some embodiments, this step 120 of authenticating the identity of the customer may be part of a strong authentication process. A strong authentication process is a security measure that requires two or more authentication steps. In this regard, the customer may have previously provided a username and password when initiating a mobile banking session (e.g., when submitting an online banking session initiation request) or when submitting the association request. Accordingly, in step 120, the customer may be prompted to enter additional authentication information (e.g., additional identification information), such as a PIN, biometric information, and/or an answer to a security question in order to further verify the identity of the customer (e.g., determine that the additional authentication information is associated with the online banking account).

At block 130, the mobile device is associated (e.g., enrolled) with the customer's online banking account. In this regard, the account identification information and customer identification information provided by the customer is typically used to locate records (e.g., customer account information) in the online banking system associated with the customer's online banking account. Once the records associated with the customer's online banking account are located, an association is made between the identity of the mobile device and the customer's online banking account. Once the association is made, at block 140, the online banking system typically creates an association record in memory of the association between the identity of the mobile device and the customer's online banking account.

This association between the identity of the mobile device and the customer's online banking account indicates that the mobile device has permission to act as a remote control for the customer's online banking account. Furthermore, this association between the device and the customer's online banking account may be used to associate the device with the customer's identity. Accordingly, the identity of the mobile device may be used to identify the customer and to identify the customer's online banking account.

In one embodiment, an enrolled mobile device may be used as an online banking remote control for a particular customer device. In other words, the enrolled mobile device may be used to control the access of a computing device of the customer to customer's online banking account. In this regard, FIG. 2 depicts a method 200 of using an enrolled mobile device as an online banking remote control for a computing device of the customer. This method is typically performed by an online banking system.

At block 210, the method 200 includes receiving (e.g., at an online banking system) a binding request to associate the mobile device with another computing device (e.g., a laptop, personal computer, tablet computer, mobile device, or other suitable electronic device) of the customer. The binding request may be submitted by the mobile device via a mobile application (e.g., a mobile banking application) or via a mobile banking website. For example, a mobile banking application downloaded onto the mobile device may prompt the customer to bind the mobile device to another device so that the mobile device can control online banking functionality of the other device.

The binding request typically includes device identification information associated with the mobile device, device identification information associated with the computing device, and the account identification information associated with the customer's online banking account.

The device identification information associated with the computing device may be any information sufficient to generate a device "fingerprint," or unique signature of the customer's computing device. Device identification information may be collected from a variety of sources. In some embodiments the device identification information includes an identification code. The identification code may be but is not limited to a serial number or an item number of the device. In some embodiments, the device identification information may be associated with a chip associated with the computing device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers.

In one embodiment, the binding request may be submitted from the computing device. In such an instance, device identification information associated with the computing device may be manually entered at the computing device. For example, the online banking system may prompt the customer for manual entry of the device identification information (e.g., a serial number, an identification code, an International Mobile Station Equipment Identity (IMEI), a phone number, a chip, a removable part, or similar pieces of device identification information). In other embodiments, device identification information associated with the computing device may not be based on user input received at the computing device. Instead, the device identification information may be automatically provided by the computing device. In yet another embodiment, the computing device may provide the information without requiring user input after receiving a request from the online banking system for the identification information. Device identification information associated with the mobile device is typically manually entered at the computing device. For example, the online banking system may prompt the customer for manual entry of the device identification information associated with the mobile device. In one embodiment, the customer may select the mobile device from a list of one or more enrolled mobile devices provided by an online banking website or online banking application. In another embodiment, the device identification information associated with the mobile device may be an identification code (e.g., an alphanumeric code) provided by the online banking system. This identification code may be provided by the online banking system to the customer when customer associates the mobile device with their online banking account or upon the request of the customer. The account identification information may be automatically provided by the computing device. Alternatively, the customer may manually provide this information. For example, the customer may enter a username and a password associated with the customer's online banking account. The username and password may be provided in conjunction with the binding request or may have been previously provided at the beginning of an online banking session (e.g., to log into an online banking application or online banking website). Accordingly, the account identification information may include information related to an online banking session. In one embodiment, because the identification information associated with the mobile device has been associated with the customer's online banking account, the identification information associated with the mobile device may also serve as account identification information.

In another embodiment, the binding request may be submitted from the mobile device. In such an instance, device identification information associated with the mobile device may be entered manually at the mobile device. For example, the online banking system may prompt the customer for manual entry of the device identification information. In other embodiments, device identification information may not be based on user input received at the mobile device. Instead, the device identification information may be automatically provided by the mobile device. In yet another embodiment, the mobile device may provide the information without requiring user input after receiving a request from the online banking system for the identification information. Device identification information associated with the computing device may be manually entered at the mobile device. The account identification information may be automatically provided by the mobile device. Alternatively, the customer may manually provide this information. For example, the customer may enter a username and a password associated with the customer's online banking account. The username and password may be provided in conjunction with the binding request or may have been previously provided at the beginning of a mobile banking session (e.g., to log into a mobile banking application or mobile banking website). Accordingly, the account identification information may include information related to a mobile banking session. Because the identification information associated with the mobile device has been associated with the customer's online banking account, the identification information associated with the mobile device may also serve as account identification information.

In yet another embodiment, the binding request may be initiated from one device and completed from another. For example, the customer may initiate the binding request from the mobile device and then complete the binding request from the computing device. Alternatively, the customer may initiate the binding request from the computing device and then complete the binding request from the mobile device. Accordingly, each device may provide its own identification information for the binding request.

In one embodiment, the identity of the customer may be authenticated after the binding request has been received. In this regard, the identification information associated with the mobile device may act as an initial level of authentication. In some embodiments, the identity of the customer may be further authenticated by the customer providing a personal identification number (PIN) or biometric information. In other embodiments, the identity of the customer may have been previously authenticated (e.g., when logging into an online banking website or online banking application).

Once the binding request has been received, the online banking system may then search the database of records to confirm that the identification information associated with the mobile device is associated with the customer's online banking account. If the identification information associated with the mobile device is not associated with the customer's online banking account, then the binding request may be denied and an error message may be sent to the device that initiated the binding request.

At block 220, the mobile device is bound to the computing device. In other words, the device identification information associated with the mobile device is bound to the device identification information associated with the computing device. Furthermore, the binding of the mobile device to the computing device is typically associated the customer's online banking account. In order to maintain the binding of the mobile device to the computing the online banking system typically creates a binding record in memory based on the device identification information associated with the mobile device, the device identification information associated with the computing device, and the account identification information associated with the customer's online banking account. Once the mobile device is bound to the computing device, the mobile device may be used to control the computing device's access to the customer's online banking account.

In one embodiment, the online banking system is configured to determine whenever the bound computing device engages in a predefined online banking transaction. By way of example, the predefined online banking transaction may be initiating an online banking session, terminating an online banking session, paying bills, viewing account statements, viewing account balances, depositing funds, withdrawing funds, or transferring funds. The predefined online banking transaction may be defined by the financial institution or may be defined by the customer (e.g., by using an online banking application or online banking website). After determining that the computing device has engaged in the predefined online banking transaction, the online banking system may be configured to transmit a notification (e.g., alert) to the mobile device that indicates that the predefined online banking transaction has occurred.

Subsequently, at block 230, a remote access command associated with the customer's online banking account and associated with the computing device is received from the mobile device. The remote access command typically specifies an access parameter and value related to the computing device and to the customer's online banking account. For example, the remote access command may include a command (i) to log the computing device in or out of the online banking account and/or (ii) lock or unlock access for the computing device to the online banking account. By way of further example, the remote access command may include a command to add or remove transaction restrictions for the computing device to the online banking account. Such transaction restrictions may allow the computing device to engage in certain transactions (e.g., view account balances and statements) but not engage in other transactions (e.g., transfer funds). The remote access command may define time restrictions where the computing device's access to the customer's online banking account is locked, unlocked, restricted, and/or unrestricted during defined time periods. The remote access command may define location restrictions where the computing device's access to the customer's online banking account is locked, unlocked, restricted, and/or unrestricted when the computing device is in certain locations. In this regard, many computing devices are capable of recognizing and transmitting the GPS coordinates for the position of the computing device. In some situations, a computing device may be capable of recognizing a network associated with a particular location, such as a customer's home or business wireless network, and use that information to transmit or otherwise make available the location information associated with the computing device.

In addition to the above described access parameters and commands, the remote access command typically includes device identification information associated with the mobile device, device identification information associated with the computing device, and account identification information associated with the customer's online banking account. Identification information associated with the mobile device may also act as account identification information. Additional customer or account identification information such as a personal identification number (PIN) or biometric information may be provided by the mobile device (e.g., to the online banking system) in order to further authenticate the identity of the customer. This additional identification information may be provided by the mobile device when initiating a mobile banking application or logging into a mobile banking website. Alternatively, this additional identification information may be provided with the remote access command or after the remote access command has been sent (e.g., upon being prompted by the online banking system to provide additional identification information).

The remote access command may be submitted by the mobile device via a mobile banking website or mobile banking application. The mobile banking website or mobile banking application may present a graphical user interface on the mobile device that allows the customer to submit a remote access command. The mobile banking website or mobile banking application may also present status information related to each device bound to the mobile device. For example, the mobile banking website or mobile banking application may indicate whether the bound computing device is logged in or out of the customer's online banking account and provide the customer with the option of logging the computing device in or out of the customer's online banking account.

Next, at block 240, the online banking system searches the database of records to determine if the device identification information associated with the mobile device is associated with the account identification information contained in the remote access command. In addition, the online banking system searches the database of records to determine if the device identification information associated with the mobile device is bound to the device identification information associated with the computing device. If the mobile device is associated with the online banking account and if the mobile device is bound to the computing device (e.g., as specified in the association record and the binding record), then the method proceeds to block 250. If the mobile device is not associated with the online banking account or if the mobile device is not bound to the computing device, then the remote access command may be rejected and an error message may be sent to the mobile device.

At block 250, the remote access of the computing device to the customer's online banking account is modified based upon the remote access command and determining that (i) the device identification information associated with the mobile device is associated with the customer's online banking account and (ii) the device identification information associated with the mobile device is bound to the device identification information associated with the computing device. For example, if the remote access command is to log the computing device on the customer's online banking account, the online banking system may transmit a command to the computing device that causes the computing device to automatically open and log into an online banking application, begin an online banking session at an online banking website, or otherwise initiate an authenticated online banking session. Similarly, if the remote access command is to log the computing device off the customer's online banking account, the online banking system may log the computing device out of any active online banking session (e.g., a session using an online banking application or website). If the remote access command is to lock the computing device out of the online banking account, the online banking system may log the computing device out of any active online banking session and also prevent the computing device from logging into the online banking account. A remote access command to unlock access may subsequently allow the computing to log into the online banking account. If the remote access command includes transaction restrictions, the online banking system may prevent the computing device from engaging in restricted transactions. If the remote access command defines time and/or location restrictions, the online banking system may lock and/or restrict the access of the computing device to the online banking account based upon the time and/or the location of the computing device. Accordingly, the computing device may transmit location information to the online banking system, which can be compared against any location restrictions. Such restrictions may be modified or removed in one or more subsequent remote access commands.

In order to receive commands from the online banking system (e.g., that were initiated by the mobile device), the computing device may include a persistently running service that listens for commands from the online banking system. In this regard, an online banking application may be installed on the computing device. This online banking application may be configured to listen for commands from the online banking system. In addition, this online banking application may be configured to provide location information associated with the computing device to the online banking system.

By using an enrolled mobile device to control access to the customer's online banking account, the customer can stop or prevent transactions that may be undesirable or unauthorized. In addition, using an enrolled mobile device can provide an easy and time saving way of initiating an online banking session on another device, which may be particularly desirable for a customer having a disability.

FIG. 3 provides a block diagram illustrating an online banking system 600 and environment 300, in accordance with an embodiment of the present invention. As illustrated in FIG. 3, the online banking environment 300 includes a mobile device 400 and a computing device 500 that may be associated with an online banking customer. The computing device may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, a tablet computer, a laptop, or other mobile device.

The mobile device 400 and the computing device 500 are typically configured to communicate over a network 350 with a financial institution's online banking system 600. The mobile device 400, the computing device 500, and the financial institution's online banking system 600 are each described in greater detail below with reference to FIGS. 4-6. The network 350 may include a local area network (LAN), a wide area network (WAN), and/or a global area network (GAN). The network 350 may provide for wireline, wireless, or a combination of wireline and wireless communication between devices in the network. In one embodiment, the network 350 includes the Internet. In one embodiment, the network 350 includes a wireless telephone network 352.

In general, the mobile device 400 is configured to connect with the network 350 to log the customer into an online banking system 600. The online banking system 600 involves authentication of the customer in order to access the customer's account on the online banking system 600. For example, the online banking system 600 is a system where the customer logs into his/her account such that the customer can access data that is associated with the customer. For example, in one embodiment of the invention, the system 600 may be an online banking system maintained by a financial institution. In such an embodiment, the customer can use the mobile device 400 to log into the online banking system to access the customer's online banking account. Logging into the online banking system 600 generally requires that the customer authenticate his/her identity using a user name, a passcode, a cookie, a biometric identifier, a private key, a token, and/or another authentication mechanism that is provided by the customer to the online banking system 600 via the mobile device 400. As described above, the identity of the mobile device 400 may be used to authenticate the identity of the customer.

The financial institution's online banking system 600 is typically in network communication with other devices, such as the computing device 500 that is configured to communicate with the network 350 to also log the customer into the online banking system 600. In one embodiment, an application download server may be used to download software applications that support the online banking system 600 to the mobile device 400 and/or computing device 500.

In some embodiments of the invention, the application download server is configured to be controlled and managed by one or more third-party data providers (not shown in FIG. 3) over the network 350. In other embodiments, the application download server is configured to be controlled and managed over the network 350 by the same entity that maintains the online banking system 600.

FIG. 4 provides a block diagram illustrating the mobile device 400 of FIG. 3 in more detail, in accordance with embodiments of the invention. In one embodiment of the invention, the mobile device 400 is a mobile telephone. However, it should be understood, however, that a mobile telephone is merely illustrative of one type of mobile device that may benefit from, employ, or otherwise be involved with embodiments of the present invention and, therefore, should not be taken to limit the scope of embodiments of the present invention. Other types of mobile devices may include portable digital assistants (PDAs), pagers, mobile televisions, gaming devices, laptop computers, cameras, video recorders, audio/video player, radio, GPS devices, or any combination of the aforementioned.

The mobile device 400 typically includes a processor 410 communicably coupled to such devices as a memory 420, user output devices 436, user input devices 440, a communication interface 460, a power source 415, a clock or other timer 450, a camera 480, and a positioning system device 475. The processor 410, and other processors described herein, typically includes circuitry for implementing communication and/or logic functions of the mobile device 400. For example, the processor 410 may include a digital signal processor device, a microprocessor device, and various analog to digital converters, digital to analog converters, and/or other support circuits. Control and signal processing functions of the mobile device 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the mobile device 400 to transmit and receive web content, such as, for example, location-based content and/or other web page content, according to a Wireless Application Protocol (WAP), Hypertext Transfer Protocol (HTTP), and/or the like.

The processor 410 is typically configured to use the communication interface 460 to communicate with one or more other devices on the network 350. In this regard, the communication interface 460 typically includes an antenna 476 operatively coupled to a transmitter 474 and a receiver 472 (together a "transceiver"). The processor 410 is typically configured to provide signals to and receive signals from the transmitter 474 and receiver 472, respectively. The signals may include signaling information in accordance with the air interface standard of the applicable cellular system of the wireless telephone network 352. In this regard, the mobile device 400 may be configured to operate with one or more air interface standards, communication protocols, modulation types, and access types. By way of illustration, the mobile device 400 may be configured to operate in accordance with any of a number of first, second, third, and/or fourth-generation communication protocols and/or the like. For example, the mobile device 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 400 may also be configured to operate in accordance with non-cellular communication mechanisms, such as via a wireless local area network (WLAN) or other communication/data networks.

The communication interface 460 may also include a near field communication (NFC) interface 470. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 470 may include a smart card, key card, proximity card, Bluetooth® device, radio frequency identification (RFID) tag and/or reader, transmitter, receiver, and/or the like. In some embodiments, the NFC interface 470 communicates information via radio, infrared (IR), and/or optical transmissions. In some embodiments, the NFC interface 470 is configured to operate as an NFC transmitter and/or as an NFC receiver (e.g., an NFC reader). Also, it will be understood that the NFC interface 470 may be embedded, built, carried, and/or otherwise supported in and/or on the mobile device 400. In some embodiments, the NFC interface 470 is not supported in and/or on the mobile device 400, but the NFC interface 470 is otherwise operatively connected to the mobile device 400 (e.g., where the NFC interface 470 is a peripheral device plugged into the mobile device 400). Other apparatuses having NFC interfaces mentioned herein may be configured similarly. In some embodiments, the NFC interface 470 of the mobile device 400 is configured to contactlessly and/or wirelessly communicate information to and/or from a corresponding NFC interface of another apparatus (e.g., another mobile or computing device).

The mobile device 400 typically has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410. The user input devices 440, which allow the mobile device 400 to receive data from a user such as the customer, may include any of a number of devices allowing the mobile device 400 to receive data from a user, such as a keypad, keyboard, touch-screen, touchpad, microphone, mouse, joystick, other pointer device, button, soft key, and/or other input device(s). The user interface may also include a camera 480, such as a digital camera.

The mobile device 400 may also include a positioning system device 475 that is configured to be used by a positioning system to determine a location of the mobile device 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate location of the mobile device 400. In other embodiments, the positioning system device 475 includes a proximity sensor or transmitter, such as an RFID tag, that can sense or be sensed by devices known to be located proximate a location to determine that the mobile device 400 is located proximate these known devices.

The mobile device 400 further includes a power source 415, such as a battery, for powering various circuits and other devices that are used to operate the mobile device 400. Embodiments of the mobile device 400 may also include a clock or other timer 450 configured to determine and, in some cases, communicate actual or relative time to the processor 410 or one or more other devices.

The mobile device 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which include computer-executable instructions/code executed by the processor 410 to implement the functions of the mobile device 400 described herein. For example, the memory 420 may include such applications as a conventional web browser application 422 and/or a mobile banking application 421. These applications also typically provide a graphical user interface (GUI) on the display 430 that allows the customer to communicate with the consumer mobile device 400, the online banking system 600, and/or other devices or systems. In one embodiment of the invention, when the customer decides to enroll in the online banking program, the customer downloads or otherwise obtains the mobile banking system client application from the online banking system 600 or from a distinct application server. In other embodiments of the invention, the customer interacts with the online banking system 600 via the web browser application 422 in addition to, or instead of, the mobile banking application 421. The online banking system 600 is typically configured to present a graphical user interface (e.g., through a mobile banking application or mobile banking website) that allows the customer to use the mobile device 400 to control access to the customer's online banking account. In this regard, the graphical user interface may include buttons (e.g., "on," "off," "lock," or "unlock") that allow the customer to control the access of the computing device 500 to the customer's online banking account.

The memory 420 can also store any of a number of pieces of information, and data, used by the mobile device 400 and the applications and devices that make up the mobile device 400 or are in communication with the mobile device 400 to implement the functions of the mobile device 400 and/or the other systems described herein. For example, the memory 420 may include such data as user authentication information.

Referring now to FIG. 5, the computing device 500 associated with the customer also includes various features, such as a network communication interface 510, a processing device 520, a user interface 530, and a memory device 550. The network communication interface 510 includes a device that allows the personal computing device 500 to communicate over the network 350 (shown in FIG. 3). In one embodiment of the invention, a network browsing application 555 provides for a user to establish network communication with the online banking system 600 (shown in FIG. 3) for the purpose accessing a customer's online banking account. In another embodiment, an online banking application 556 allows the user of the computing device 500 to a customer's online banking account. In addition, the online banking application 556 may be configured to listen for access commands from the online banking system 600 and transmit location information associated with the computing device to the online banking system 600.

As used herein, a "processing device," such as the processing device 520, generally refers to a device or combination of devices having circuitry used for implementing the communication and/or logic functions of a particular system. For example, a processing device 520 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 520 may further include functionality to operate one or more software programs based on computer-executable program code thereof, which may be stored in a memory. As the phrase is used herein, a processing device 520 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 530 generally includes a plurality of interface devices and/or software that allow a customer to input commands and data to direct the processing device to execute instructions. For example, the user interface 530 presented in FIG. 5 may include a graphical user interface (GUI) or an interface to input computer-executable instructions that direct the processing device 520 to carry out specific functions. The user interface 530 employs certain input and output devices to input data received from the customer or output data to the customer. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 550 generally refers to a device or combination of devices that store one or more forms of computer-readable media for storing data and/or computer-executable program code/instructions. Computer-readable media is defined in greater detail below. For example, in one embodiment, the memory device 550 includes any computer memory that provides an actual or virtual space to temporarily or permanently store data and/or commands provided to the processing device 520 when it carries out its functions described herein.

FIG. 6 provides a block diagram illustrating the online banking system 600 in greater detail, in accordance with an embodiment of the invention. As illustrated in FIG. 6, in one embodiment of the invention, the online banking system 600 includes a processing device 620 operatively coupled to a network communication interface 610 and a memory device 650. In certain embodiments, the online banking system 600 is operated by a financial institution, while in other embodiments, the online banking system 600 is operated by an entity other than a financial institution.

It should be understood that the memory device 650 may include one or more databases or other data structures/repositories. The memory device 650 also includes computer-executable program code that instructs the processing device 620 to operate the network communication interface 610 to perform certain communication functions of the online banking system 600 described herein. For example, in one embodiment of the online banking system 600, the memory device 650 includes, but is not limited to, a network server application 670, an authentication application 660, a customer account data repository 680 which includes customer authentication data 680 and customer account information 684, an online banking application 690 which includes a web server application 693, a downloadable online banking client application 694, and other computer-executable instructions or other data. The computer-executable program code of the network server application 670, the authentication application 660, or the online banking application 690 may instruct the processing device 620 to perform certain logic, data-processing, and data-storing functions of the online banking system 600 described herein, as well as communication functions of the online banking system 600.

In one embodiment, the customer account data repository 680 includes customer authentication data 682 and customer account information 684. The network server application 670, the authentication application 660, and the online banking application 690 are configured to implement customer account information 684 and the customer authentication data 682 (e.g., customer identification information) when authenticating a customer to the online banking system 600. In this regard, the customer authentication data 682 may include a customer's username, password, PIN number, and device identification information associated with an enrolled mobile device. The customer account information 684 may include account identification information, association records related to one or more enrolled mobile devices, and binding records related to one or more groups of bound devices.

As used herein, a "communication interface" typically includes a modem, server, transceiver, and/or other device for communicating with other devices on a network, and/or a user interface for communicating with one or more customers. Referring again to FIG. 6, the network communication interface 610 is a communication interface having one or more communication devices configured to communicate with one or more other devices on the network 350, such as the mobile device 400, the computing device 500, and the online banking system 600. The processing device 620 is typically configured to use the network communication interface 610 to transmit and/or receive data and/or commands to and/or from the other devices connected to the network 350.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

To supplement the present disclosure, this application further incorporates entirely by reference the following commonly assigned patent applications: U.S. patent application Ser. No. 13/946,304 for "Online Banking Alerts," filed Jul. 19, 2013; U.S. patent application Ser. No. 13/946,511 for "Customer-Defined Online Banking Access Restrictions," filed Jul. 19, 2013; U.S. patent application Ser. No. 13/946,658 for "Restricted Access to Online Banking," filed Jul. 19, 2013; U.S. Patent Application Ser. No. 13/946,519 for "Offline Mobile Banking," filed Jul. 19, 2013; U.S. patent application Ser. No. 13/946,570 for "Completing Mobile Banking Transactions from Trusted Location," filed Jul. 19, 2013; U.S. patent application Ser. No. 13/946,581 for "Completing Mobile Banking Transaction with Different Devices," filed Jul. 19, 2013; U.S. patent application Ser. No. 13/946,425 for an "Online Session Transfer," filed Jul. 19, 2013; and U.S. patent application Ser. No. 13/946,068 for "Systems for Managing Account Aggregators Access to Financial Account Information," filed Jul. 19, 2013.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for providing remote control of a customer's online banking account, comprising:
 a computer apparatus including a processor and a memory; and an online banking module stored in the memory, executable by the processor and configured to:
 receive an association request from the customer to associate a first mobile device with the customer's online banking account, the association request comprising device identification information associated with the first mobile device and first account identification information associated with the customer's online banking account;

associate the device identification information associated with the first mobile device with the customer's online banking account and create an association record based on the device identification information associated with the first mobile device and the first account identification information associated with the customer's online banking account;

receive a binding request from the customer to bind the first mobile device with a first computing device, the binding request comprising the device identification information associated with the first mobile device, device identification information associated with the first computing device, and second account identification information associated with the customer's online banking account;

bind the device identification information associated with the first mobile device with the device identification information associated with the first computing device and create a binding record based on the device identification information associated with the first mobile device, the device identification information associated with the first computing device. and the second account identification information associated with the customer's online banking account;

receive a remote access command associated with the customer's online banking account from the first mobile device, the remote access command comprising the device identification information associated with the first mobile device, the device identification information associated with the first computing device, third account identification information associated with the customer's online banking account and at least one location restriction defining the first computing device's access to the online banking account;

receive, at the processor, from the first computing device, GPS coordinates corresponding to the current location of the first computing device;

determine, based on the GPS coordinates received from the first computing device, whether the first computing device has access to the online banking account;

search a database of records to determine, based on (a) the device identification information associated with the first mobile device, (b) the device identification information associated with the first computing device, and (c) the third account identification information associated with the customer's online banking account comprised in the remote access command: (i) if the device identification information associated with the first mobile device is associated with the third account identification information and (ii) if the device identification information associated with the first mobile device is bound to the device identification information associated with the first computing device; and transmit a command to the first computing device based on the remote access command and determining that (i) the device identification information associated with the first mobile device is associated with the third account identification information (ii) the device identification information associated with the first mobile device is bound to the device identification information associated with the first computing device, and (iii) the first computing device has access to the online banking account, wherein, upon receiving the command the first computing device automatically opens an online banking application installed on the first computing device and initiates an online banking session by logging the first computing device onto the customer's online banking account using the online banking application.

2. The system according to claim 1, wherein the online banking module is configured to:
receive first authentication information from the first mobile device;
determine that the first authentication information is associated with the customer's online banking account;
initiate an online banking session with the first mobile device based on determining that the first authentication information is associated with the customer's online banking account;
thereafter, receive second authentication information from the first mobile device; and
determine that the second authentication information is associated with the customer's online banking account;
wherein associating the device identification information associated with the first mobile device with the customer's online banking account and creating an association record is further based on determining that the second authentication information is associated with the customer's online banking account.

3. The system according to claim 2, wherein:
the first authentication information comprises a username and a password; and
the second authentication information comprises a personal identification number (PIN) and/or biometric information.

4. The system according to claim 1, wherein the online banking module is configured to:
before receiving the remote access command, receive an online banking session initiation request from the first mobile device, the online banking session initiation request comprising the device identification information associated with the first mobile device;
determine that the device identification information associated with the first mobile device is associated with the customer's online banking account;
initiate an online banking session with the first mobile device based on determining that the device identification information associated with the first mobile device is associated with the customer's online banking account;
thereafter, receive authentication information from the first mobile device; and
determine that the authentication information is associated with the customer's online banking account;
wherein transmitting the command to the first computing device is further based on determining that the authentication information is associated with the customer's online banking account.

5. The system according to claim 4, wherein:
the authentication information comprises a personal identification number (PIN) and/or biometric information.

6. A computer program product for remote control of a customer's online banking account, comprising a non-transitory computer-readable storage medium having computer-executable instructions for:
receiving an association request from the customer to associate a first mobile device with the customer's online banking account, the association request comprising device identification information associated with the first mobile device and first account identification information associated with the customer's online banking account;
associating the device identification information associated with the first mobile device with the customer's online banking account and creating an association record based on the device identification information associated with the first mobile device and the first account identification information associated with the customer's online banking account;

receiving a binding request from the customer to bind the first mobile device with a first computing device, the binding request comprising the device identification information associated with the first mobile device, device identification information associated with the first computing device, and second account identification information associated with the customer's online banking account;

binding the device identification information associated with the first mobile device with the device identification information associated with the first computing device and creating a binding record based on the device identification information associated with the first mobile device, the device identification information associated with the first computing device, and the second account identification information associated with the customer's online banking account;

receiving a remote access command associated with the customer's online banking account from the first mobile device, the remote access command comprising the device identification information associated with the first mobile device, the device identification information associated with the first computing device, third account identification information associated with the customer's online banking account and at least one location restriction defining the first computing device's access to the online banking account;

receiving, at the processor, from the first computing device, GPS coordinates corresponding to the current location of the first computing device;

determining, based on the GPS coordinates received from the first computing device, whether the first computing device has access to the online banking account;

searching a database of records to determine, based on (a) the device identification information associated with the first mobile device, (b) the device identification information associated with the first computing device, and (c) the third account identification information associated with the customer's online banking account comprised in the remote access command: (i) if the device identification information associated with the first mobile device is associated with the third account identification information and (ii) if the device identification information associated with the first mobile device is bound to the device identification information associated with the first computing device; and transmitting a command to the first computing device based on the remote access command and determining that (i) the device identification information associated with the first mobile device is associated with the third account identification information (ii) the device identification information associated with the first mobile device is bound to the device identification information associated with the first computing device, and (iii) the first computing device has access to the online banking account, wherein, upon receiving the command the first computing device automatically opens an online banking application installed on the first computing device and initiates an online banking session by logging the first computing device onto the customer's online banking account using the online banking application.

7. The computer program product according to claim 6, wherein the non-transitory computer-readable storage medium has computer-executable instructions for:
receiving first authentication information from the first mobile device;
determining that the first authentication information is associated with the customer's online banking account;
initiating an online banking session with the first mobile device based on determining that the first authentication information is associated with the customer's online banking account;
thereafter, receiving second authentication information from the first mobile device; and
determining that the second authentication information is associated with the customer's online banking account;
wherein associating the device identification information associated with the first mobile device with the customer's online banking account and creating an association record is further based on determining that the second authentication information is associated with the customer's online banking account.

8. The computer program product according to claim 7, wherein:
the first authentication information comprises a username and a password; and
the second authentication information comprises a personal identification number (PIN) and/or biometric information.

9. The computer program product according to claim 6, wherein the non-transitory computer-readable storage medium has computer-executable instructions for:
before receiving the remote access command, receiving an online banking session initiation request from the first mobile device, the online banking session initiation request comprising the device identification information associated with the first mobile device;
determining that the device identification information associated with the first mobile device is associated with the customer's online banking account;
initiating an online banking session with the first mobile device based on determining that the device identification information associated with the first mobile device is associated with the customer's online banking account;
thereafter, receiving authentication information from the first mobile device; and
determining that the authentication information is associated with the customer's online banking account;
wherein transmitting the command to the first computing device is further based on determining that the authentication information is associated with the customer's online banking account.

10. The computer program product according to according to claim 9, wherein:
the authentication information comprises a personal identification number (PIN) and/or biometric information.

11. A method For remote control of a customer's online banking account, comprising:
receiving, with a computer processor, an association request from the customer to associate a first mobile device with the customer's online banking account, the association request comprising device identification information associated with the first mobile device and first account identification information associated with the customer's online banking account;
associating, with a computer processor, the device identification information associated with the first mobile, device with the customer's online banking account and creating an association record based on the device identification information associated with the first mobile device and the first account identification information associated with the customer's online banking account;

receiving, with a computer processor, a binding request from the customer to bind the first mobile device with a first computing device, the binding request comprising the device identification information associated with the first mobile device, device identification information associated with the first computing device, and second account identification information associated with the customer's online banking account;

binding, with a computer processor, the device identification information associated with the first mobile device with the device identification information associated with the first computing device and creating a binding record based on the device identification information associated with the first mobile device, the device identification information associated with the first computing device, and the second account identification information associated with the customer's online banking account;

receiving, with a computer processor, a remote access command associated with the customer's online banking account from the first mobile device, the remote access command comprising the device identification information associated with the first mobile device, the device identification information associated with the first computing device, and third account identification information associated with the customer's online banking account;

receiving, at the processor, from the first computing device, GPS coordinates corresponding to the current location of the first computing device;

determining, based on the GPS coordinates received from the first computing device, whether the first computing device has access to the online banking account;

searching, with a computer processor, a database of records to determine, based on (a) the device identification information associated with the first mobile device, (b) the device identification information associated with the first computing device, and (c) the third account identification information associated with the customer's online banking account comprised in the remote access command: (i) if the device identification information associated with the first mobile device is associated with the third account identification information and (ii) if the device identification information associated with the first mobile device is bound to the device identification information associated with the first computing device; and transmitting a command to the first computing device based on the remote access command and determining that (i)the device identification information associated with the first mobile device is associated with the third account identification information (ii) the device identification information associated with the first mobile device is bound to the device identification information associated with the first computing device, and (iii) the first computing device has access to the online banking account, (iii) the first computing device has access to the online banking account, wherein, upon receiving the command the first computing device automatically opens an online banking application installed on the first computing device and initiates an online banking session by logging the first computing device onto the customer's online banking account using the online banking application.

12. The method according to claim 11, comprising:
receiving first authentication information from the first mobile device;
determining that the first authentication information is associated with the customer's online banking account;
initiating an online banking session with the first mobile device based on determining that the first authentication information is associated with the customer's online banking account;
thereafter, receiving second authentication information from the first mobile device; and
determining that the second authentication information is associated with the customer's online banking account;
wherein associating the device identification information associated with the first mobile device with the customer's online banking account and creating an association record is further based on determining that the second authentication information is associated with the customer's online banking account.

13. The method according to claim 12, wherein:
the first authentication information comprises a username and a password; and
the second authentication information comprises a personal identification number (PIN) and/or biometric information.

14. The method according to claim 11, comprising:
before receiving the remote access command, receiving an online banking session initiation request from the first mobile device, the online banking session initiation request comprising the device identification information associated with the first mobile device;
determining that the device identification information associated with the first mobile device is associated with the customer's online banking account;
initiating an online banking session with the first mobile device based on determining that the device identification information associated with the first mobile device is associated with the customer's online banking account;
thereafter, receiving authentication information from the first mobile device; and
determining that the authentication information is associated with the customer's online banking account;
wherein transmitting the command to the first computing device is further based on determining that the authentication information is associated with the customer's online banking account.

15. The method according to claim 14, wherein:
the authentication information comprises a personal identification number (PIN) and/or biometric information.

* * * * *